June 16, 1959     D. A. GALONSKA     2,890,594
HELICAL SPLINE ASSEMBLY
Filed Aug. 18, 1958
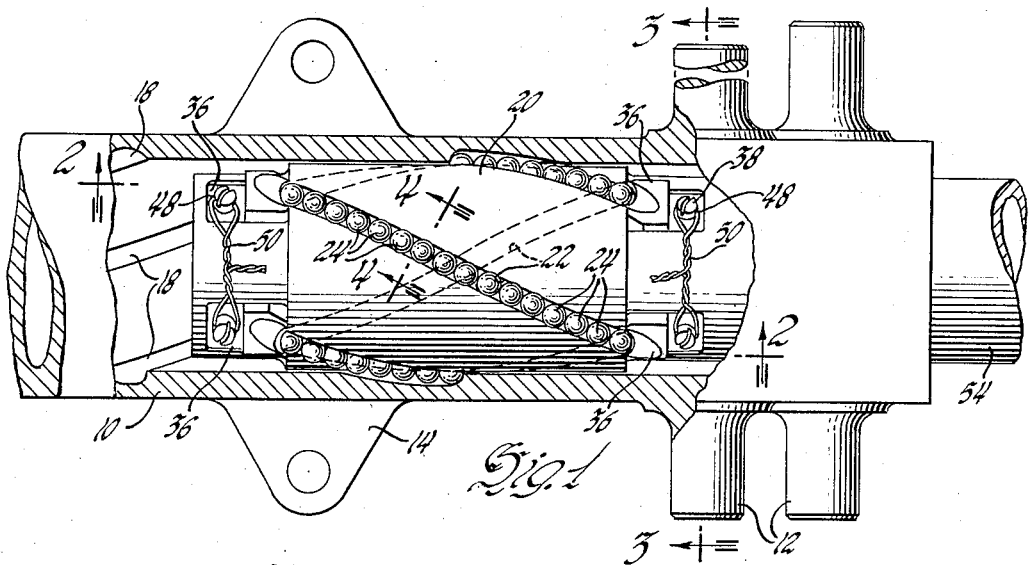
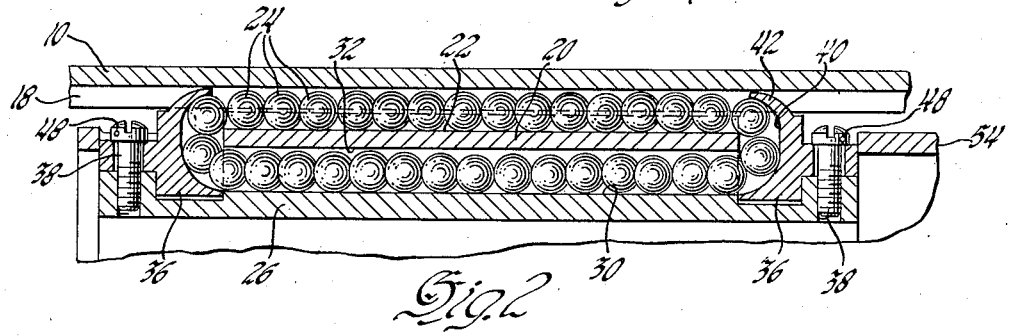
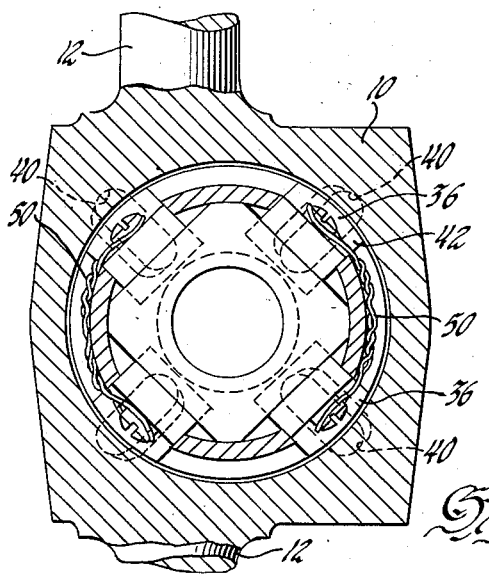
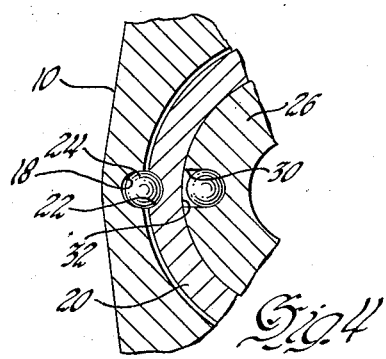
INVENTOR.
David A. Galonska
BY
Paul Fitzpatrick
ATTORNEY United States Patent Office 2,890,594
Patented June 16, 1959

2,890,594
HELICAL SPLINE ASSEMBLY

David A. Galonska, Saginaw, Mich., assignor to General Motors Corporation, Detroit, Mich., a corporation of Delaware Application August 18, 1958, Serial No. 755,636

3 Claims. (Cl. 74—424.8)

This invention concerns ball bearing helical spline devices and has as its principal object to provide a device of this type which can be applied in the transmission of high torque loads even when fabricated with a high helix angle and to a small diameter, as compared to conventional constructions designed for similar purposes.

Another object is to supply a ball bearing helical spline assembly which displays lower friction losses than conventional designs.

A more general object is to provide a power transmission device enabling the translation of rotary motion into combined linear and rotary motion.

Additional objects and features of the invention will be apparent from the following description of a preferred embodiment thereof illustrated by the accompanying drawings wherein—

Figure 1 is a view partly in elevation and partly in section, certain parts being shown broken away;

Figure 2 is a section on the line 2—2 in Figure 1;

Figure 3 is a section on the line 3—3 in Figure 1; and

Figure 4 is a fragmentary section taken on the line 4—4 in Figure 1.

As shown in Figure 1, the device comprises an outer tubular member 10 provided with trunnions 12 and apertured flanges 14. These trunnions and flanges have relation to a particular application contemplated and form no part of the present invention.

Member 10 has therein a plurality of internal helical grooves 18, four such grooves being used in the case of the particular design.

Confined within member 10 is an intermediate component 20 likewise tubular in construction. This component is provided with a plurality of external helical grooves 22 complementary to the grooves 18 so as to form courses for the balls 24 supplying the connection between such component and the member 10.

A third or inner component 26, preferably of tubular construction, has therein a plurality of external helical grooves 30 (Figure 4) serving with the internal wall 32 of the intermediate component 20 to provide return passages for the balls 24.

As best illustrated by Figures 2 and 4, the transfer of the balls 24 from the helical courses formed by grooves 18 and 22 to the passages 30 or vice versa is a function of elements 36 secured to the inner component 26 at either end thereof, the fastening means in the case of the illustrated embodiment taking the form of screws 38. Elements 36 are arcuately formed at 40 for smooth transfer of the balls and comprise integral flanges 42, precluding axial displacement of the intermediate component 20 relative to component 26.

The heads of the screws 38 will be seen as apertured at 48 for the accommodation of lock wires 50 (Figures 1 and 4) preventing loosening of the screws.

In operation of the device, a tubular shaft 54 suitably secured to the inner component 26 is moved axially to so move the components 20 and 26. Because of the helical ball connection between component 20 and the outer tubular member 10, the latter is caused to rotate as well as to move axially, inducing the desired displacements of the parts, not shown, connected to member 10 via the trunnions 12 and the flanges 14. Incident to such action the balls, of course, travel the courses or passages set by the grooves 18, 22 and 30 and transfer elements 36.

The invention claimed is:

1. A ball bearing spline assembly comprising an outer tubular component having therein a plurality of internal helical grooves, an intermediate tubular component having therein a corresponding number of external helical grooves forming ball courses with said first grooves, an inner component having therein a like number of external grooves providing return ball passages with the internal wall of said intermediate tubular member, and a plurality of ball transfer elements at either end of said inner component which are travelled by the balls at they enter the return passages from said courses or vice versa.

2. An assembly conforming to claim 1 where the said inner component is of tubular construction and the grooves therein are helical.

3. An assembly conforming to claim 2 where said transfer elements are fastened to said inner component and are formed to prevent axial displacement of said intermediate component relative to said inner component.

References Cited in the file of this patent

UNITED STATES PATENTS

| | | |
|---|---|---|
| 576,199 | Kimball | Feb. 2, 1897 |
| 2,520,785 | Schlicksupp | Aug. 29, 1950 |